(12) United States Patent
Sjöberg et al.

(10) Patent No.: US 12,363,321 B2
(45) Date of Patent: **\*Jul. 15, 2025**

(54) ARRANGEMENTS AND METHODS OF ENCODING PICTURE BELONGING TO A TEMPORAL LEVEL

(71) Applicant: Telefonaktiebolaget LM Ericsson (publ), Stockholm (SE)

(72) Inventors: Rickard Sjöberg, Stockholm (SE); Jonatan Samuelsson, Stockholm (SE)

(73) Assignee: Telefonaktiebolaget LM Ericsson (publ), Stockholm (SE)

( \* ) Notice: Subject to any disclaimer, the term of this patent is extended or adjusted under 35 U.S.C. 154(b) by 0 days.

This patent is subject to a terminal disclaimer.

(21) Appl. No.: 18/495,901

(22) Filed: Oct. 27, 2023

(65) Prior Publication Data

US 2024/0056586 A1 Feb. 15, 2024

Related U.S. Application Data

(63) Continuation of application No. 17/688,931, filed on Mar. 8, 2022, now Pat. No. 11,843,787, which is a continuation of application No. 16/883,252, filed on May 26, 2020, now Pat. No. 11,297,335, which is a continuation of application No. 16/127,358, filed on Sep. 11, 2018, now Pat. No. 10,708,604, which is a continuation of application No. 15/661,053, filed on Jul. 27, 2017, now Pat. No. 10,104,384, which is a continuation of application No. 14/394,178, filed as application No. PCT/SE2013/050409 on Apr. 15, 2013, now Pat. No. 9,749,644.

(60) Provisional application No. 61/624,496, filed on Apr. 16, 2012.

(51) Int. Cl.
*H04N 19/177* (2014.01)
*H04N 19/31* (2014.01)
*H04N 19/573* (2014.01)
*H04N 19/503* (2014.01)
*H04N 19/70* (2014.01)

(52) U.S. Cl.
CPC ........... *H04N 19/177* (2014.11); *H04N 19/31* (2014.11); *H04N 19/573* (2014.11); *H04N 19/503* (2014.11); *H04N 19/70* (2014.11)

(58) Field of Classification Search
CPC .... H04N 19/177; H04N 19/573; H04N 19/31; H04N 19/70
See application file for complete search history.

(56) References Cited

U.S. PATENT DOCUMENTS

2007/0183494 A1\* 8/2007 Hannuksela ........... H04N 19/70
375/240.1
2009/0003439 A1 1/2009 Wang et al.
(Continued)

OTHER PUBLICATIONS

International Search Report for International Application No. PCT/SE2013/050409 mailed Jul. 23, 2013, 4 pages.
(Continued)

*Primary Examiner* — Richard T Torrente
(74) *Attorney, Agent, or Firm* — Sage Patent Group

(57) ABSTRACT

A method performed by a video encoder for encoding a current picture belonging to a temporal level identified by a temporal_id. The method includes determining a Reference Picture Set (RPS) for the current picture indicating reference pictures that are kept in a decoded picture buffer (DPB) when decoding the current picture, and when the current picture is a temporal switching point. The method further includes operating to ensure that the RPS of the current picture includes no picture having a temporal_id greater than or equal to the temporal_id of the current picture.

15 Claims, 8 Drawing Sheets

(56) References Cited

U.S. PATENT DOCUMENTS

| | | | |
|---|---|---|---|
| 2013/0089134 A1* | 4/2013 | Wang | H04N 19/423 |
| | | | 375/E7.026 |
| 2013/0170561 A1 | 7/2013 | Hannuksela | |
| 2013/0188738 A1* | 7/2013 | Hannuksela | H04N 19/31 |
| | | | 375/240.25 |

OTHER PUBLICATIONS

Written Opinion of the International Searching Authority for International Application No. PCT/SE2013/050409 mailed Jul. 23, 2013, 8 pages.

Samuelsson et al: "AHG15: Temporal layer access pictures", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H0566, Jan. 21, 2012.

Hannuksela et al: "AHG21: Removal of reference picture list modification", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H0426, Jan. 20, 2012.

Flynn et al: "JCT-VC AHG report: Reference picture buffering and list construction (AHG21)", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-G021, Nov. 21, 2011.

European Office Action Corresponding to European Patent Application No. 13 723 267; Dated: Jun. 9, 2016; 6 Pages.

\* cited by examiner

ARRANGEMENTS AND METHODS OF ENCODING PICTURE BELONGING TO A TEMPORAL LEVEL

CROSS REFERENCE TO RELATED APPLICATIONS

This application is a continuation of U.S. patent application Ser. No. 17/688,931 filed on 8 Mar. 2022, which itself is a continuation of U.S. patent application Ser. No. 16/883,252 filed on 26 May 2020 (now U.S. Pat. No. 11,297,335), which itself is a continuation of U.S. patent application Ser. No. 16/127,358 filed on 11 Sep. 2018 (now U.S. Pat. No. 10,708,604), which itself is a continuation of U.S. patent application Ser. No. 15/661,053 filed on 27 Jul. 2017 (now U.S. Pat. No. 10,104,384), which itself is a continuation of U.S. patent application Ser. No. 14/394,178 filed on 13 Oct. 2014 (now U.S. Pat. No. 9,749,644), which itself is a 35 U.S.C. § 371 national stage application of PCT International Application No. PCT/SE2013/050409 filed on 15 Apr. 2013, which itself claims the benefit of U.S. provisional Patent Application No. 61/624,496 filed on 16 Apr. 2012, the disclosures and contents of each of which are incorporated by reference herein in their entirety. The above-referenced PCT International Application was published in the English language as International Publication No. WO 2013/158020 A1 on 24 Oct. 2013.

TECHNICAL FIELD

The embodiments relate to arrangements, i.e. an encoder, an element, a receiver, a transmitter, computer program products, computer programs, and methods for processing video. In particular, the embodiments relate to video processing supporting temporal layers.

BACKGROUND

High Efficiency Video Coding (HEVC) is a new video coding standard currently being developed in Joint Collaborative Team-Video Coding (JCT-VC). JCT-VC is a collaborative project between MPEG and ITU-T. Currently, a Committee Draft (CD) is defined that includes a number of new tools and is considerably more efficient than H.264/AVC.

A picture coded/decoded according to HEVC is partitioned into one or more slices, where each slice is an independently decodable segment of the picture. This means that if a slice is missing, for instance got lost during transmission, the other slices of that picture can still be decoded correctly. In order to make slices independent, they are self contained and do not depend on each other which imply that no bitstream element of another slice is required for decoding any element of a given slice.

Each slice contains a slice header which provides data for the slice to be independently decodable. One example of a data element present in the slice header is the slice address, which is used for the decoder to know the spatial location of the slice. There are many more data elements in the slice header.

HEVC uses previously decoded pictures for encoding and decoding a current picture. These previously decoded pictures are referred to as reference pictures. The encoder indicates to the decoder which reference pictures that are allowed to be used for decoding in a reference picture set (RPS). The previously decoded pictures are stored in a decoded picture buffer (DPB) and the RPS indicates which pictures in the DPB that should be kept, i.e. which are allowed to be used as reference pictures and which pictures in the DPB that should be discarded, i.e. never be used for reference again. It should be noted that the encoder contains a copy of the decoder's DPB.

FIG. 1 illustrates a simplified scenario, where the pictures are distinguished by a picture order count (POC). In this case the RPS indicates POC 1 and POC 2 which implies that the reference pictures identified by POC 1 and POC2 should be kept in the DPBs and the pictures identified by POC 3 should be discarded unless it should be outputted for display.

The reference picture set (RPS) for each picture consists of five different lists (not shown in FIG. 1) of reference pictures, also referred to as the five RPS subsets: RefPicSetStCurrBefore consists of all short-term reference pictures that are prior to the current picture in both decoding order and output order, and that are available for inter prediction of the current picture. RefPicSetStCurrAfter consists of all short-term reference pictures that are prior to the current picture in decoding order, that succeed the current picture in output order, and that are made available for inter prediction of the current picture. RefPicSetStFoll consists of all short-term reference pictures that are available for inter prediction of one or more of the pictures following the current picture in decoding order, and that are unavailable for inter prediction of the current picture. RefPicSetLtCurr consists of all long-term reference pictures that are available for inter prediction of the current picture. RefPicSetLtFoll consists of all long-term reference pictures that are available for inter prediction of one or more of the pictures following the current picture in decoding order, and that are unavailable for inter prediction of the current picture.

The RPS controls which pictures that are possible to put in the reference picture list. However, a picture that is put in the reference picture list may or may not be used for inter prediction but for a picture to be used for inter prediction (used for reference) for the current picture it is required that the picture is included in a reference picture list, in one of the lists denoted Curr. In short, RPS controls, which reference pictures to keep in the DPB and which reference pictures to discard from the DPB. Thus, pictures that are listed in the RPS (any of the 5 RPS lists) are kept and pictures that does not listed are discarded. Then RPS also controls which pictures that are possible to put in the reference picture lists L0 and L1. The pictures in the Foll lists cannot be put in L0 and L1. L0 and L1 may only contain some of the pictures from Curr lists. Finally, the encoder chooses what reference pictures from L0 and L1 to use for inter prediction for each block. It may for example choose to use one reference picture for all blocks, even if L0 and L1 contains many pictures.

The HEVC draft specification specifies that each picture shall belong to a temporal layer and that a syntax element called temporal_id shall be present for each picture in the bitstream, corresponding to the temporal layer the picture belongs to.

The temporal layers are ordered and have the property that a picture of a lower temporal layer never references a picture of a higher temporal layer. Thus, higher temporal layers can be removed without affecting the lower temporal layers. The removal of temporal layers can be referred to as temporal scaling. Removal of layers can be done in an entity that is neither an encoder nor a decoder, such as a network node. Such an entity can, but is not limited to, forward video bitstream packets from an encoder to a decoder and perform removal of temporal layers without performing full video decoding on the incoming data.

The resulting bitstream after one or more temporal layers have been removed is called a subsequence. In HEVC it is possible to signal that a picture is a temporal layer switching point, which indicates that at this picture it is possible for a decoder to start decoding more temporal layers than what was decoded before the switching point. The switching point indication guarantees that no picture following the switching point references a picture from before the switching point that might not have been decoded because it belongs to a higher temporal layer than what was decoded before the switching point. The switching points are therefore very useful for a layer removal entity in order to know when to stop removing a certain temporal layer and start forwarding it.

An example is shown in FIG. 2 where vertical axis represents temporal layer and the horizontal axis represent output order. The numbers in the pictures represent decoding order. The arrows represent inter prediction.

Temporal switching can be performed at any point except at picture $P_6$ (to picture $P_7$) since $P_7$ uses $P_5$ for inter prediction.

HEVC contains four different picture types: instant decoder refresh (IDR), clean random access (CRA), temporal layer access (TLA) and regular pictures (non-IDR, non-CRA and non-TLA).

IDR and CRA pictures must have temporal_id equal to 0. TLA pictures must have temporal_id greater than 0.

The TLA picture type is used to define a temporal layer switching point and is currently defined as:

temporal layer access (TLA) picture: A coded picture for which each slice has nal_unit_type equal to 3; the TLA picture and all coded pictures with temporal_id greater than or equal to the temporal_id of the TLA picture that follow the TLA picture in decoding order shall not use inter prediction from any picture with temporal_id greater than or equal to the temporal_id of the TLA picture that precedes the TLA picture in decoding order.

According to the current HEVC specification, it is allowed to include a reference picture from the same or higher temporal layer in the reference picture set of a TLA picture. It is also allowed to include a reference picture from the same temporal layer in the reference picture lists of the TLA picture as long as it is not used for inter prediction. However if a media-aware network element (MANE) performs temporal layer switching at that point, the reference picture in the RPS from the same temporal layer as the TLA picture would not be in the DPB.

However, it is specified for the RPS that:

When the first coded picture in the bitstream is an IDR picture or the current coded picture is not a leading picture of the first coded picture in the bitstream, there shall be no entry in RefPicSetStCurrBefore, RefPicSetStCurrAfter or RefPicSetLtCurr that is equal to "no reference picture".

An entry being equal to "no reference picture" means that the picture is not present in the DPB.

Thus this requirement on the RPS would violated which means that with the current HEVC specification it is possible to use the TLA picture type even though it is not possible to perform valid temporal layer switching.

SUMMARY

A problem with the existing HEVC specification is that an encoder can use the TLA picture type for a picture that has a picture P in its reference picture set even though P precedes the TLA picture in decoding order and has the same temporal identity. As long as picture P is not used for inter prediction this is fine. This requires a MANE to keep track of the RPS state so that it does not perform a switching at that TLA picture. It would be preferable that the MANE only has to check the picture types and be certain that switching at a TLA picture cannot result in a bitstream that breaks bitstream conformance.

For example (referring to FIG. 2), it is possible to include $P_1$ in the reference picture set of $P_2$ and still code $P_2$ as a TLA picture (since $P_1$ is not used by $P_2$ or any picture that follows $P_2$ in decoding order). Then $P_1$ can be included in the RefPicSetStCurrBefore of $P_3$ as long as it is not used for inter prediction. However if a temporal switch was actually performed at $P_2$, $P_1$ would not be in the DPB when $P_3$ is decoded which would violate the requirement on the RPS.

Thus the purpose of the embodiments is to solve the problem with the current definition of TLA pictures (also referred to as TSA pictures) that it is possible to use the TLA picture type even though switching at the point of the TLA picture results in a bitstream that violates a bitstream requirement.

In the embodiments presented herein a restriction that reference pictures from the same or higher temporal layer cannot be included in the reference picture set for a TLA picture is introduced. In this way, it is guaranteed that a substream after temporal switching is always bitstream conformant according to HEVC.

According to one aspect of the embodiments a method is provided. In the method, a current picture belonging to a temporal level is encoded and an RPS for the current picture is determined, wherein the RPS indicates the reference pictures to be kept in the DPB when decoding the current picture. When it is determined that the current picture is a temporal switching point such as a TSA picture, it is ensured that there is no picture included in the RPS with temporal_id greater than or equal to the temporal_id of the current picture.

According to a second aspect, a method performed in an element for parsing bits representing at least a part of a current picture, wherein the current picture belongs to a temporal level identified by a temporal_id, is provided. The current picture is associated with an RPS indicating reference pictures to be kept in the DPB when decoding the current picture. In the method, it is asserted that for each TSA picture there is no picture included in the RPS of the temporal switching point that has the same or higher temporal_id as the TSA picture. If there is such a picture it is interpreted as a bit-error, loss of data or non-compliant bitstream.

According to a third aspect, a video encoder for encoding a current picture belonging to a temporal level identified by a temporal_id is provided. The encoder comprises a unit for determining an RPS for the current picture. The RPS indicates the reference pictures and to be kept in the DPB when decoding the current picture. The encoder further comprises an RPS controlling unit for ensuring that the RPS of the current picture includes no picture having a temporal_id greater than or equal to the temporal_id of the current picture when the current picture 550 is a temporal switching point.

According to a fourth aspect, an element for parsing bits representing at least a part of a current picture, wherein the current picture belongs to a temporal level identified by a temporal_id is provided. The current picture is received by an input unit and the current picture is associated with an RPS which indicates the reference pictures to be kept in the DPB when decoding the current picture. The element comprises a parsing unit configured to assert that for the current picture, when being a temporal switching point, there is no picture included in the RPS of the current picture that has the same or higher temporal_id as the current picture. The element further comprises a determining unit configured to interpret that as a bit-error, loss of data or non-compliant bitstream when there is such a picture included in the RPS.

According to a fifth aspect, a transmitter comprising a video encoder for encoding a current picture belonging to a temporal level identified by a temporal_id is provided. The encoder comprises a unit for determining an RPS for the current picture indicating reference pictures to be kept in the DPB when decoding the current picture, and an RPS controlling unit for ensuring that the RPS of the current picture includes no picture having a temporal_id greater than or equal to the temporal_id of the current picture when the current picture is a temporal switching point.

According to a sixth aspect, a receiver comprising an element for parsing bits representing at least a part of a current picture, wherein the current picture belongs to a temporal level identified by a temporal_id is provided. The current picture is associated with an RPS indicating reference pictures to be kept in the DPB when decoding the current picture. The element comprises a parsing unit configured to assert that for the current picture, when being a temporal switching point, there is no picture included in the RPS of the current picture that has the same or higher temporal_id as the current picture, and a determining unit configured to interpret that as a bit-error, loss of data or non-compliant bitstream when there is such a picture included in the RPS.

According to a seventh aspect, a device is provided. The device comprises a transmitter as mentioned above and/or a receiver as also mentioned above. The device can be exemplified by video camera e.g. in a mobile device or any other device for displaying or outputting a video stream.

According to an eighth aspect a computer program is provided. The computer program comprises computer readable code units which when run on a processor causes the processor to:
  determine an RPS for the current picture indicating reference pictures to be kept in the DPB when decoding the current picture, and
when the current picture is a temporal switching point,
  ensure that the RPS of the current picture includes no picture having a temporal_id greater than or equal to the temporal_id of the current picture.

According to a ninth aspect a computer program product is also provided comprising computer readable medium and a computer program according to the eighth aspect stored on the computer readable medium.

According to a tenth aspect a computer program is provided. The computer program, comprises computer readable code units which when run on a processor causes the processor to:
  assert that for the current picture, when being a temporal switching point, there is no picture included in the RPS of the current picture that has the same or higher temporal_id as the current picture, if there is such a picture included in the RPS,
  interpret that as a bit-error, loss of data or non-compliant bitstream.

According to an eleventh aspect a computer program product is also provided, comprising computer readable medium and a computer program according to tenth aspect stored on the computer readable medium.

An advantage with the embodiments is that the provided restriction makes temporal layer access pictures more useful. The embodiments can for instance be used in a network node or MANE to perform temporal layer switching without parsing and keeping track of RPSs. The network node or MANE needs only to inspect the NAL (Network Abstraction Layer) unit type to safely perform temporal layer switching. Without the embodiments, such a switching may lead to the outputting of a bitstream that is not compliant with HEVC.

DETAILED DESCRIPTION

The embodiments of the present invention relates to video coding processes where previously decoded pictures are used for reference pictures when decoding a current picture and where each picture belongs to a temporal layer as explained above.

More specifically, the embodiments relate to pictures being a temporal layer switching point exemplified by temporal layer access (TLA) pictures, The temporal layer switching point indicates that at this picture it is possible for a decoder to start decoding more temporal layers than what was decoded before the switching point. The switching point indication guarantees that no picture following the switching point references a picture from before the switching point that might not have been decoded because it belongs to a higher temporal layer than what was decoded before the switching point. The switching points are therefore very useful for a layer removal entity in order to know when to stop removing a certain temporal layer and start forwarding it.

The problem with the current definition of TLA pictures is that it is possible to use the TLA picture type even though switching at the point of the TLA picture results in a bitstream that violates the requirement on the RPS.

The TLA pictures are hereinafter referred to as TSA (temporal sub-layer access) pictures.

In one embodiment that is solved by a method to be performed by encoder applying the restriction that:

"When the current picture is a TSA picture, there shall be no picture included in the RPS with temporal_id greater than or equal to the temporal_id of the current picture."

Figure 1:
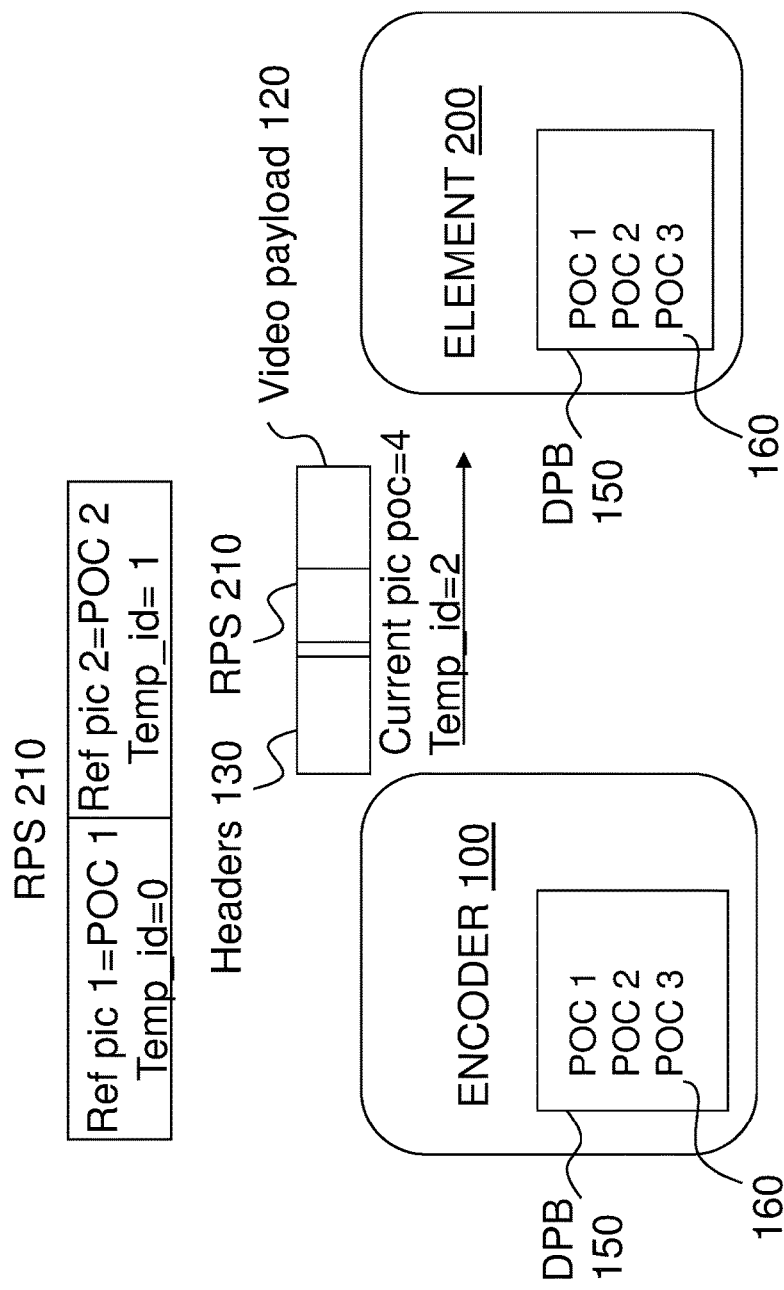
FIG. 1 illustrates schematically an RPS and how the RPS indicates which reference pictures to be kept in the DPB according to prior art.
Figure 2:
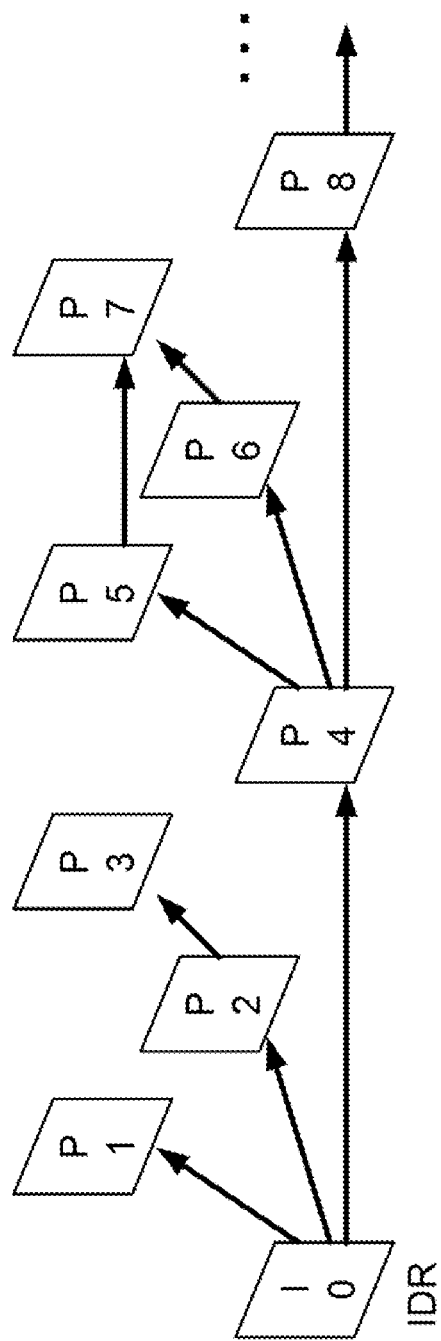
FIG. 2 illustrates pictures in different temporal layers according to prior art.
Figure 3:
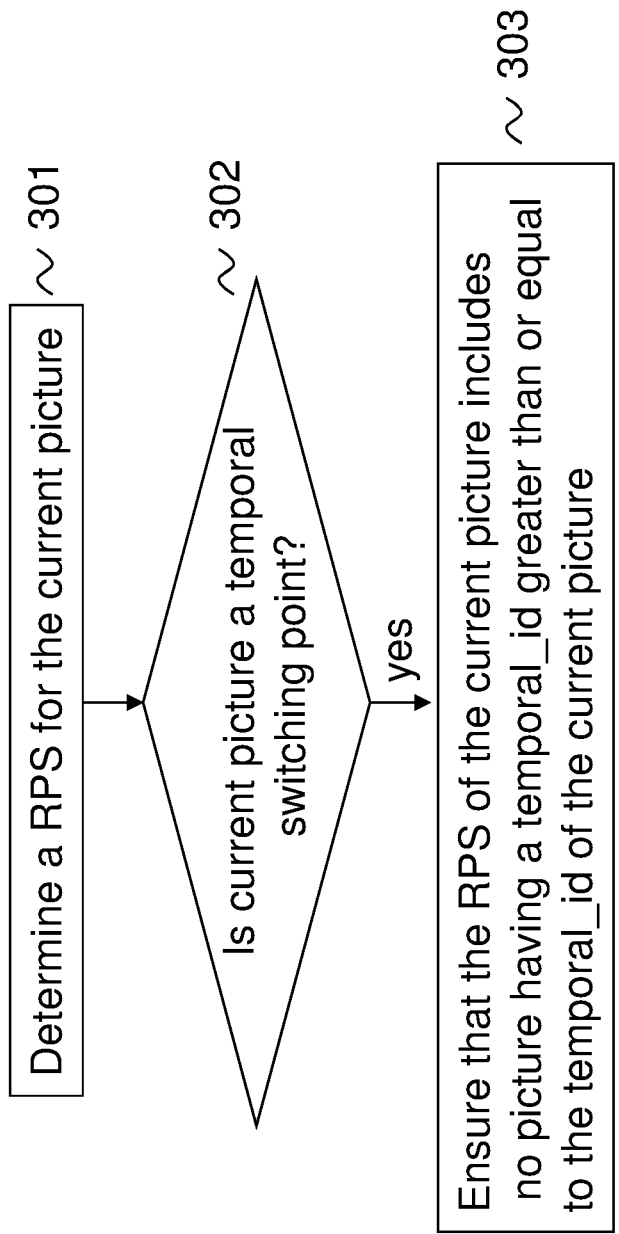
FIGS. 3 and 4 are flowcharts illustrating methods according to embodiments of the present invention.

A method according to one aspect of the embodiments is provided as illustrated in FIG. 3. In the method, the encoder encodes a current picture belonging to a temporal level and determines 301 an RPS for the current picture, wherein the RPS indicates the reference pictures to be kept in the DPB when decoding the current picture. The reference pictures may be allowed to be used for reference pictures for the current picture and/or future pictures. Typically, the RPS is determined before the pixel values of the picture are encoded. When the encoder determines 302 that the current picture is a temporal switching point such as aTSA picture, the encoder ensures 303 that there is no picture included in the RPS with temporal_id greater than or equal to the temporal_id of the current picture. Thus the pictures indicated in the RPS should not have a temporal_id greater than or equal to the temporal_id of the current picture.

According to one embodiment, the picture, being a temporal switching point, is a TSA picture which is defined as:

Temporal sub-layer access (TSA) picture: A coded picture for which each slice has nal_unit_type equal to 3; the TSA picture and all coded pictures with temporal_id greater than or equal to the temporal_id of the TSA picture that follow the TSA picture in decoding order shall not include any picture in their reference picture set that precedes the TSA picture in decoding order and for which temporal_id is greater than or equal to the temporal_id of the TSA picture.

According to this embodiment, the encoder is configured to perform the following:

When encoding a TSA picture the encoder ensures that the reference pictures indicated to be allowed for reference by the RPS of the TSA picture only include pictures with lower temporal_id than the TSA picture.

According to this embodiment, an element that operates on a bitstream (such as a network-node or a Media Aware Network Element) is configured to perform the following:

By using the embodiments, the element receiving a decoded bitstream can perform temporal switching at a temporal switching point, exemplified by the TSA picture, without scanning the RPS of the temporal switching point for pictures in the same temporal layer with used_by_curr_pic_flag equal to 1 which indicates that the picture is allowed to be used for reference. The element can be sure that it is possible to perform temporal layer switching at any TSA picture.

Figure 4:
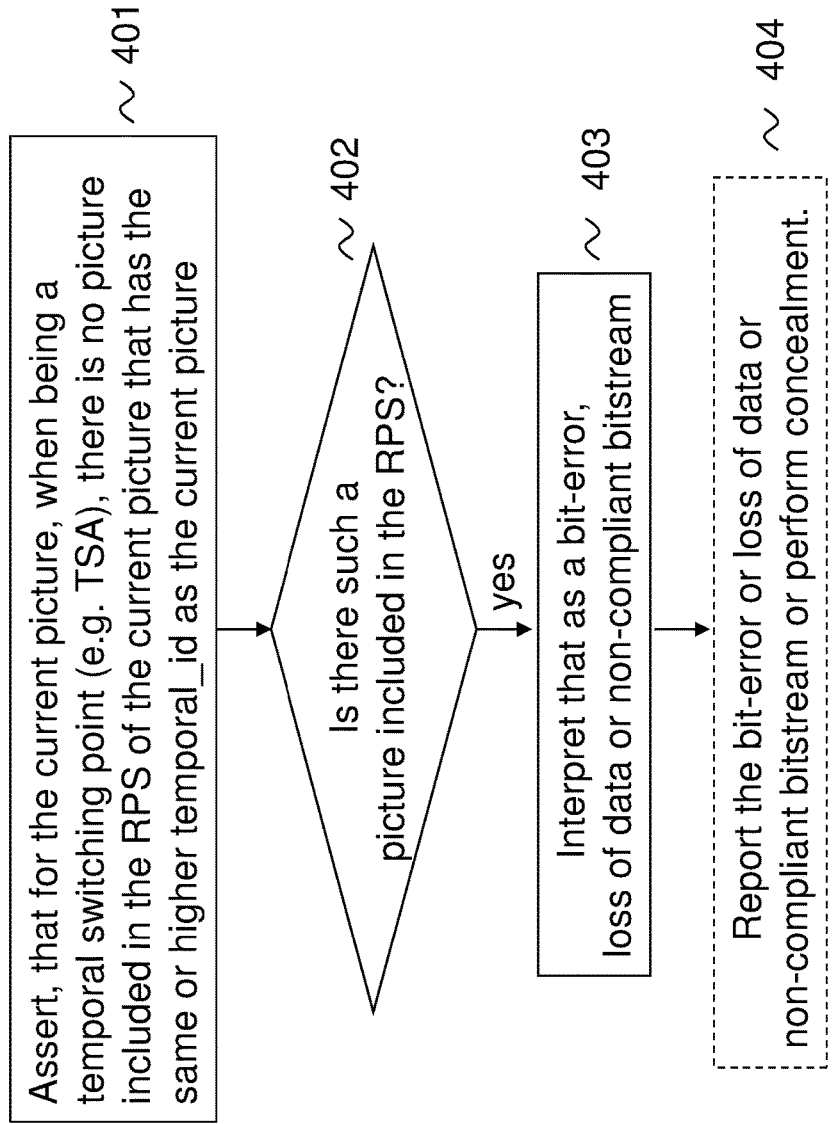

Accordingly a method performed in an element is provided as illustrated in FIG. 4. The element is parsing bits representing at least a part of a current picture (i.e. the encoded bits), wherein the current picture belongs to a temporal layer. The element may parse the header bits (e.g. the slice bits) of the picture (i.e. bits representing at least a part of the current picture) or the bits representing the entire picture. If the element is a decoder the element parses the bits and also decodes the bits.

In the method, the element asserts 401 that for each TSA picture (i.e. for each temporal switching point) there is no picture included in the RPS of the temporal switching point that has the same or higher temporal_id as the TSA picture. If there is such a picture 402 the element is configured to interpret 403 that as a bit-error, loss of data or non-compliant bitstream or non-compliant encoder and take appropriate action (e.g. report the error or perform concealment). If there is no such picture the element is configured to interpret the bitstream as a correct bitstream, forward the current picture to a decoder or decode the TSA picture if the element comprises a decoder.

The element can be a decoder, or any element that operates on a bitstream that can perform temporal switching such as a network-node or a Media Aware Network Element (MANE).

Figure 5:
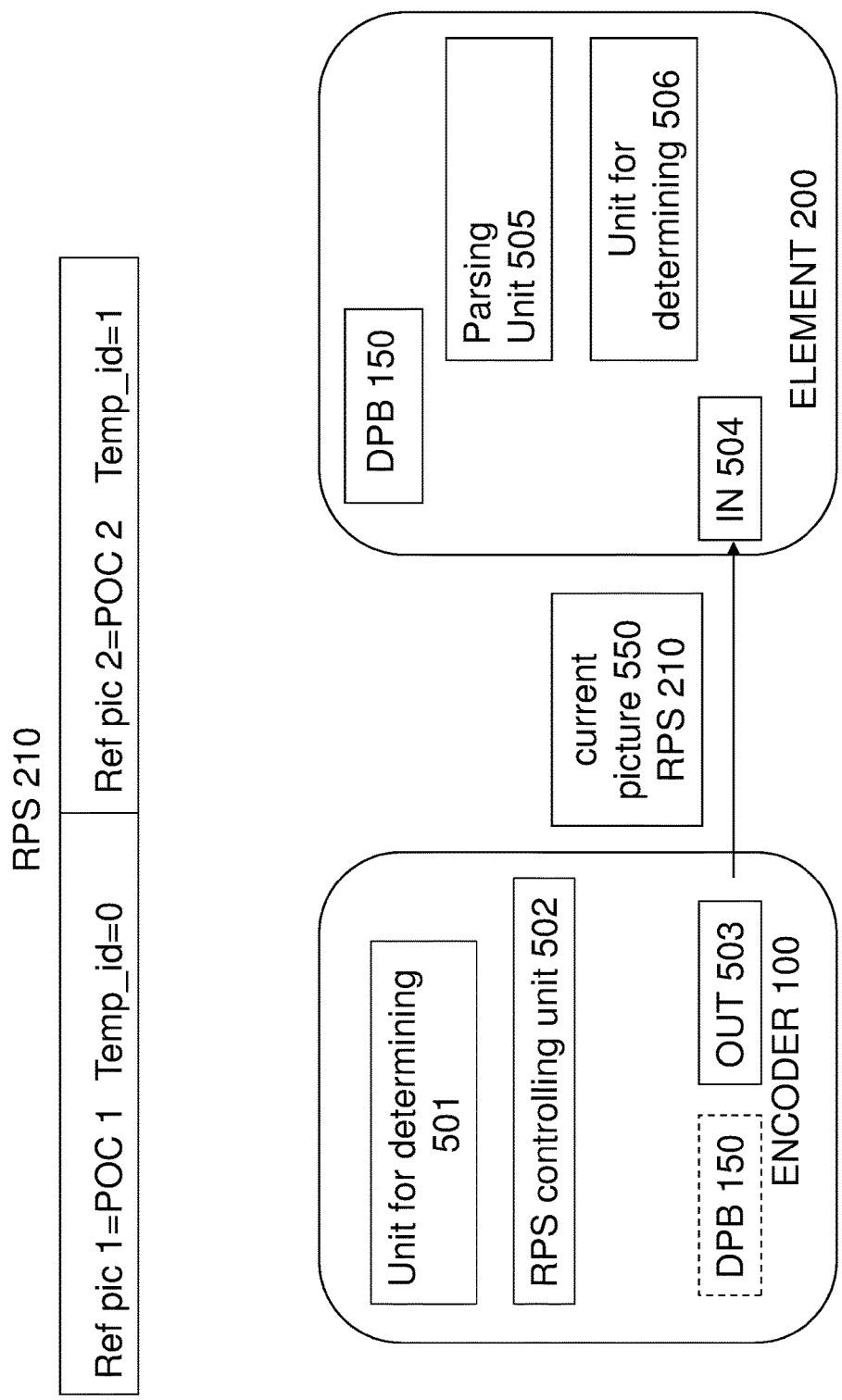
FIG. 5 illustrates schematically an encoder and an element according to embodiments of the present invention.

With reference according to FIG. 5, a video encoder 100 for encoding a current picture belonging to a temporal level identified by a temporal_id is provided. The encoder 100 comprises a unit 501 for determining an RPS 210 for the current picture 550. The RPS 210 indicates the reference pictures to be kept in the DPB when decoding the current picture 550. The encoder further comprises an RPS controlling unit 502 for ensuring that the RPS of the current picture includes no picture having a temporal_id greater than or equal to the temporal_id of the current picture 550 when the current picture 550 is a temporal switching point. Typically, the encoder 100 comprises an output unit 503 configured to send the current picture 550 and the RPS 210 and also a copy of the DPB 150 of the decoder.

Further, the RPS controlling unit 502 is configured to ensure that the TSA picture and all coded pictures with temporal_id greater than or equal to the temporal_id of the TSA picture that follow the TSA picture in decoding order shall not include any picture in their reference picture set that precedes the TSA picture in decoding order and for which temporal_id is greater than or equal to the temporal_id of the TSA picture.

With further reference to FIG. 5, an element 200 for parsing a current picture 550 belonging to a temporal level identified by a temporal_id. The current picture is received by an input unit 504 and the current picture is associated with an RPS 210 which indicates the reference pictures to be kept in the DPB when decoding the current picture. Hence, the reference pictures are allowed to be used for reference for the current picture and/or the future pictures. The element 200 comprises a parsing unit 505 configured to assert that for the current picture 550, when being a temporal switching point, there is no picture included in the RPS of the current picture that has the same or higher temporal_id as the current picture. The element further comprises a determining unit 506 configured to interpret that as a bit-error, loss of data or non-compliant bitstream when there is such a picture included in the RPS. If the element is a decoder it comprises a DPB 150 comprising previously decoded pictures. The decoded pictures indicated by the RPS are allowed to be used as reference pictures when decoding the current picture and/or the future pictures.

According to an embodiment, the determining unit 506 is further configured to reporting the bit-error or loss of data or non-compliant bitstream and/or to perform concealment if there is at least one reference picture included in the RPS of the current picture that has the same or higher temporal_id as the current picture:

The current picture which is a temporal switching point, is according to an embodiment a temporal sub-layer access (TSA picture). The TSA picture is defined as: The TSA and all coded pictures with temporal_id greater than or equal to the temporal_id of the TSA picture that follow the TSA picture in decoding order shall not include any picture in their reference picture set that precedes the TSA picture in decoding order and for which temporal_id is greater than or equal to the temporal_id of the TSA picture.

The TSA picture can further be defined as a temporal layer switching point which is a coded picture for which each slice has a unique nal_unit_type, e.g. nal_unit_type equal to 3.

Moreover, the unit for determining 506 may be configured to check for pictures that are not TSA pictures, that their RPS does not include a picture before a TSA picture that has a temporal_id equal or higher than the temporal_id of said TSA picture.

Figure 6:
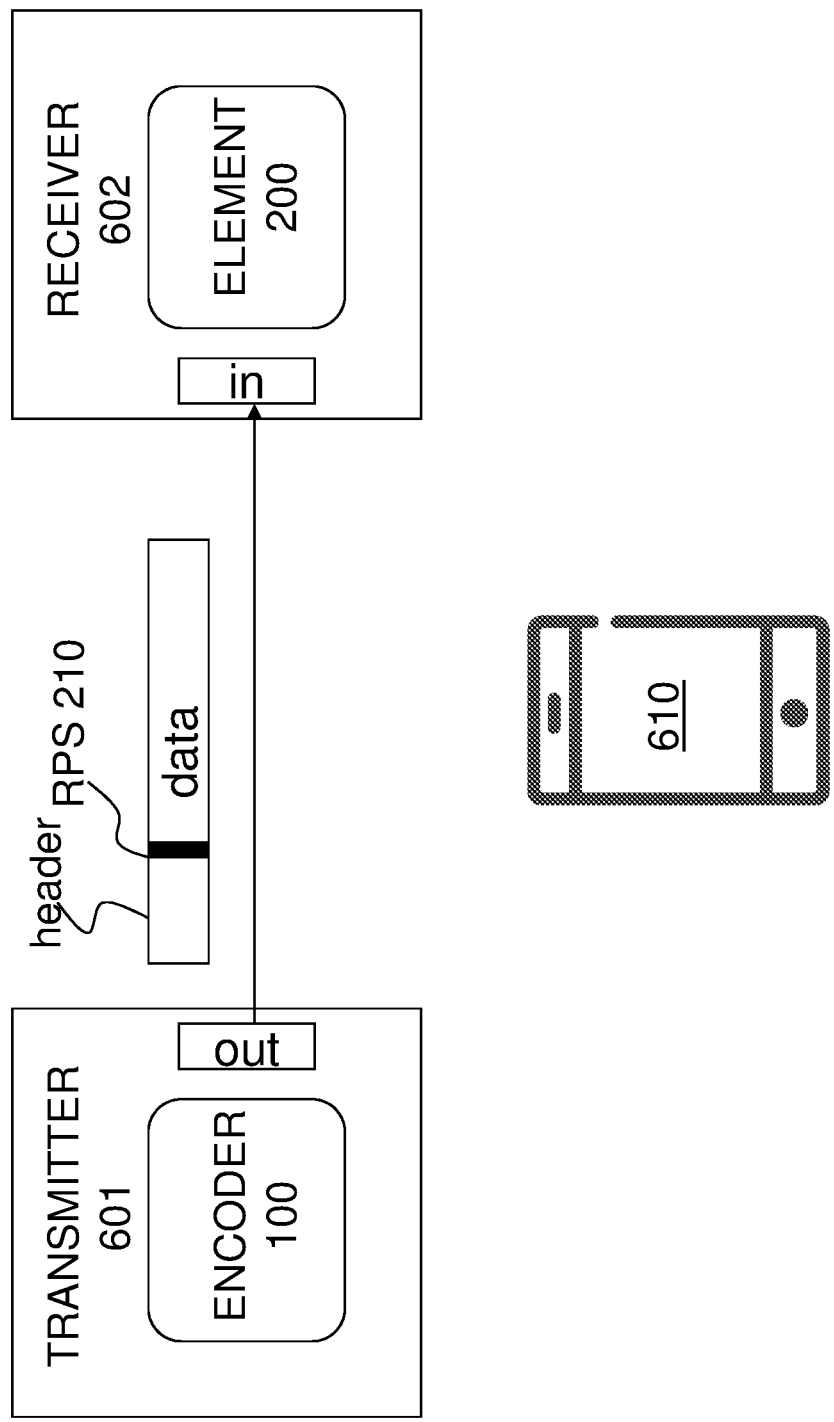
FIG. 6 illustrates schematically aa transmitter and a receiver according to embodiments of the present invention.

Turning to FIG. 6, a transmitter 601 comprising a video encoder 100 for encoding a current picture belonging to a temporal level identified by a temporal_id is provided. The encoder 100 comprises a unit 501 for determining an RPS for the current picture indicating reference pictures to be kept in the DPB when decoding the current picture, and an RPS controlling unit 502 for ensuring that the RPS of the current picture includes no picture having a temporal_id greater than or equal to the temporal_id of the current picture when the current picture is a temporal switching point.

In addition, a receiver 602 comprising an element 200 for parsing bits representing at least a part of a current picture, wherein the current picture belongs to a temporal level identified by a temporal_id is provided. The current picture is associated with an RPS indicating reference pictures to be kept in the DPB when decoding the current picture. The element 200 comprises a parsing unit 505 configured to assert that for the current picture, when being a temporal switching point, there is no picture included in the RPS of the current picture that has the same or higher temporal_id as the current picture, and a determining unit 506 configured to interpret that as a bit-error, loss of data or non-compliant bitstream when there is such a picture included in the RPS.

Further a device 610 comprising a transmitter 601 as mentioned above and/or a receiver 602 as also mentioned above. The device can be exemplified by video camera e.g. in a mobile device or any other device for displaying or outputting a video stream.

The embodiments can be applied for HEVC, which implies that the encoder can be an HEVC encoder and the decoder can be an HEVC decoder, but are not limited to HEVC. The embodiments can be applied to any extension of HEVC such as a scalable extension or multiview extension or to other similar video codecs.

Thus according to the embodiments, an encoder and any element that operates on a bitstream such as a network-node or a Media Aware Network Element is configured to make sure that when the current picture is a TSA picture, there shall be no picture included in the RPS with temporal_id greater than or equal to the temporal_id of the current picture.

The different embodiments define different ways to implement the conditions and how to indicate the syntax element.

Further, the functionalities of the encoder (and similar entity) and the decoder can be implemented by a respective processor and memory, wherein the memory stores software code portions that can be executed by the processor to perform said functionalities.

Figure 7:
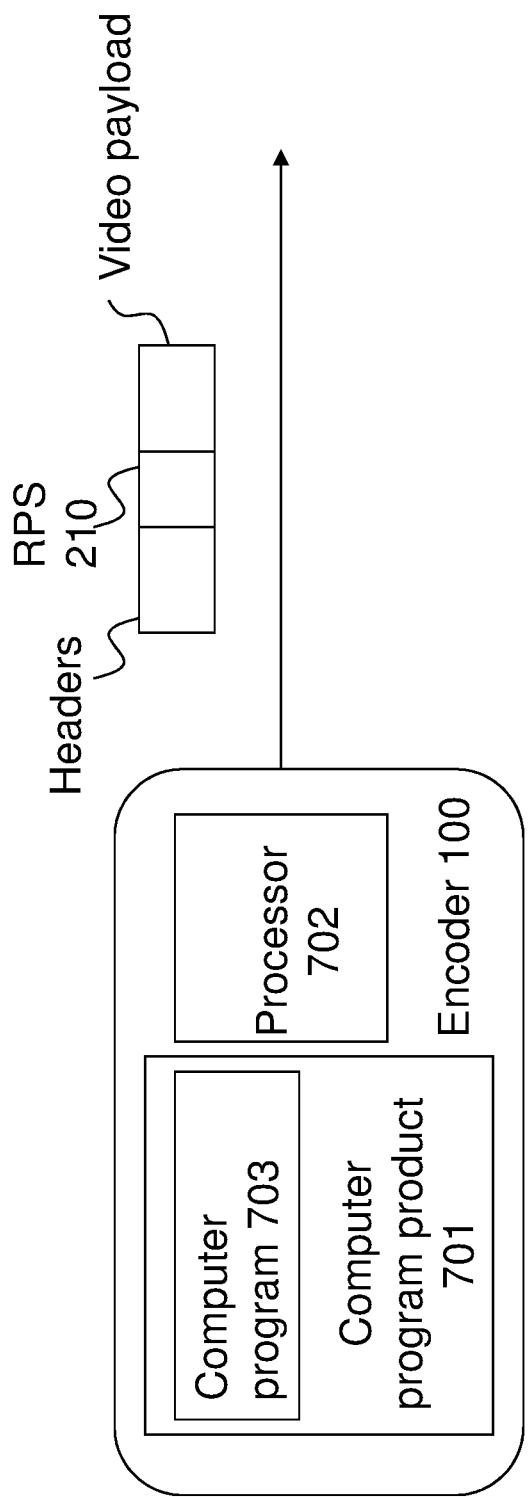
FIGS. 7 and 8 illustrate schematically the encoder and the element implemented by respective computer program and computer program product.

As illustrated in FIG. 7, a computer program 703, is provided. The computer program 703 comprises computer readable code units which when run on a processor (702) causes the processor (702) to:
determine an RPS for the current picture indicating the reference pictures to be kept in the DPB when decoding the current picture, and
when the current picture is a temporal switching point,
ensure that the RPS of the current picture includes no picture having a temporal_id greater than or equal to the temporal_id of the current picture.

A computer program product 701 is also provided comprising computer readable medium and a computer program 703 stored on the computer readable medium.

Figure 8:
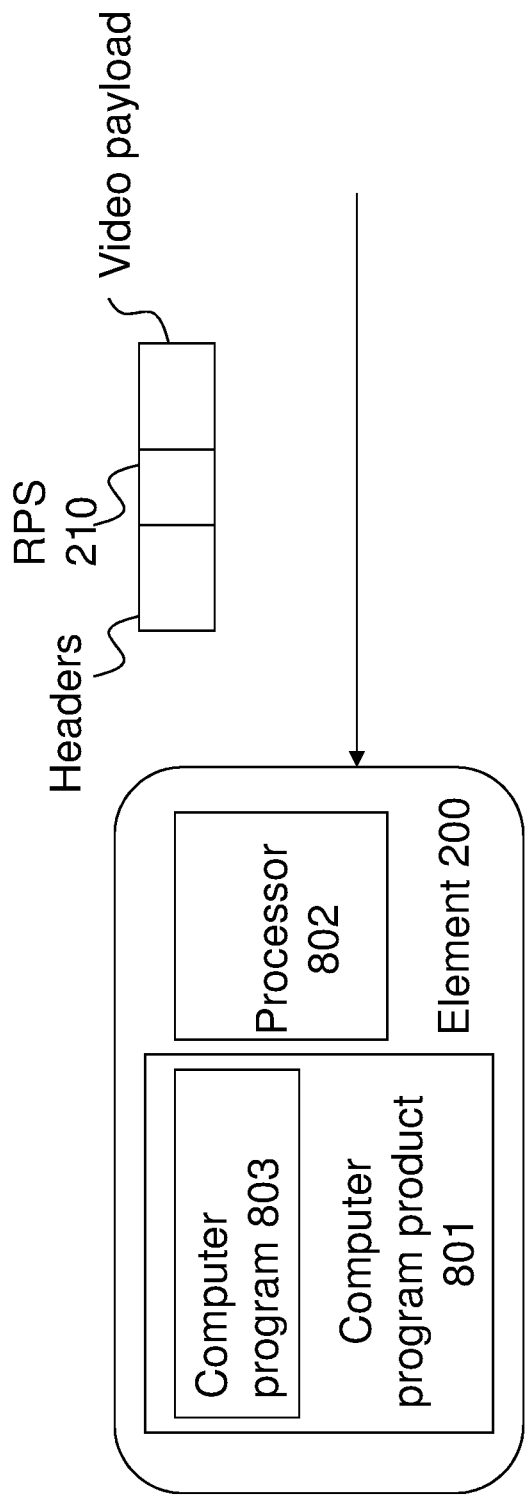

As illustrated in FIG. 8, a computer program 803 is provided. The computer program 803, comprises computer readable code units which when run on a processor 802 causes the processor 802 to:
assert that for the current picture, when being a temporal switching point, there is no picture included in the RPS of the current picture that has the same or higher temporal_id as the current picture, if there is such a picture included in the RPS,
interpret that as a bit-error, loss of data or non-compliant bitstream.

The invention claimed is:

1. A video encoder for encoding a current picture belonging to a temporal level identified by a temporal_id, the video encoder comprising:
at least one processor circuit; and
at least one memory circuit storing program code that is executed by the at least one processor circuit to perform operations comprising to:
determine a Reference Picture Set (RPS) for the current picture indicating reference pictures that are used when decoding the current picture; and
encode the current picture to, when the current picture is a temporal switching point and is a temporal sub-layer access (TSA) picture, trigger a parsing circuit to perform parsing of bits representing at least a part of the current picture to determine when coded pictures with temporal_id greater than or equal to the temporal_id of the TSA picture that follow the TSA picture in decoding order include no picture in their reference picture set for which temporal_id is greater than or equal to the temporal_id of the TSA picture.

2. The video encode of claim 1, wherein the encoding is further configured to ensure that the RPS of the current picture includes no picture having a temporal_id greater than or equal to the temporal_id of the current picture when the current picture is the TSA picture.

3. The video encoder according to claim 1, wherein the operation to encode is operative to identify a bit-error based on determining that coded pictures with temporal_id greater than or equal to the temporal_id of the TSA picture that follow the TSA picture in decoding order include a picture in their reference picture set that precedes the TSA picture in decoding order and for which temporal_id is greater than or equal to the temporal_id of the TSA picture.

4. The video encoder according to claim 1, wherein the operation to encode is operative to identify a loss of data based on determining that coded pictures with temporal_id greater than or equal to the temporal_id of the TSA picture that follow the TSA picture in decoding order include a picture in their reference picture set that precedes the TSA picture in decoding order and for which temporal_id is greater than or equal to the temporal_id of the TSA picture.

5. The video encoder according to claim 1, wherein the operation to encode is operative to identify a non-compliant bitstream based on determining that coded pictures with temporal_id greater than or equal to the temporal_id of the TSA picture that follow the TSA picture in decoding order include a picture in their reference picture set that precedes the TSA picture in decoding order and for which temporal_id is greater than or equal to the temporal_id of the TSA picture.

6. The video encoder according to claim 1, wherein the temporal switching point is a coded picture for which each slice has a unique nal_unit_type.

7. The video encoder according to claim 6, wherein the TSA picture is a coded picture for which each slice has a unique nal_unit_type equal to 3.

8. The video encoder according to claim 1, wherein the video encoder is a High Efficiency Video Coding (HEVC) encoder.

9. A computer program product for encoding a current picture belonging to a temporal level identified by a temporal_id, the computer program product comprising:
at least one non-transitory computer readable medium storing program code that is executable by at least one processor circuit to perform operations comprising to:
determine a Reference Picture Set (RPS) for the current picture indicating reference pictures that are used when decoding the current picture; and
encode the current picture to, when the current picture is a temporal switching point and is a temporal sub-layer access (TSA) picture, trigger a parsing circuit to perform parsing of bits representing at least a part of the current picture to determine when coded pictures with temporal_id greater than or equal to the temporal_id of the TSA picture that follow the TSA picture in decoding order include no picture in their reference picture set for which temporal_id is greater than or equal to the temporal_id of the TSA picture.

10. The computer program product according to claim 9, wherein the encoding is further configured to ensure that the RPS of the current picture includes no picture having a temporal_id greater than or equal to the temporal_id of the current picture when the current picture is the TSA picture.

11. The computer program product according to claim 9, wherein the operation to encode is operative to identify a bit-error based on determining that coded pictures with temporal_id greater than or equal to the temporal_id of the TSA picture that follow the TSA picture in decoding order include a picture in their reference picture set that precedes the TSA picture in decoding order and for which temporal_id is greater than or equal to the temporal_id of the TSA picture.

12. The computer program product according to claim 9, wherein the operation to encode is operative to identify a loss of data based on determining that coded pictures with temporal_id greater than or equal to the temporal_id of the TSA picture that follow the TSA picture in decoding order include a picture in their reference picture set that precedes the TSA picture in decoding order and for which temporal_id is greater than or equal to the temporal_id of the TSA picture.

13. The computer program product according to claim 9, wherein the operation to encode is operative to identify a non-compliant bitstream based on determining that coded pictures with temporal_id greater than or equal to the temporal_id of the TSA picture that follow the TSA picture in decoding order include a picture in their reference picture set that precedes the TSA picture in decoding order and for which temporal_id is greater than or equal to the temporal_id of the TSA picture.

14. The computer program product according to claim 9, wherein the temporal layer switching point is a coded picture for which each slice has a unique nal_unit_type.

15. The computer program product according to claim 9, wherein the TSA picture is a coded picture for which each slice has a unique nal_unit_type equal to 3.

* * * * *